(12) United States Patent
Shin et al.

(10) Patent No.: US 10,685,451 B2
(45) Date of Patent: *Jun. 16, 2020

(54) METHOD AND APPARATUS FOR IMAGE REGISTRATION

(71) Applicant: SAMSUNG MEDISON CO., LTD., Hongcheon-gun (KR)

(72) Inventors: Dong-kuk Shin, Hongcheon-gun (KR); Bong-koo Seo, Hongcheon-gun (KR); Sung-jin Choi, Hongcheon-gun (KR)

(73) Assignee: SAMSUNG MEDISON CO., LTD., Hongcheon-gun (KR)

(*) Notice: Subject to any disclaimer, the term of this patent is extended or adjusted under 35 U.S.C. 154(b) by 158 days.

This patent is subject to a terminal disclaimer.

(21) Appl. No.: 15/810,928

(22) Filed: Nov. 13, 2017

(65) Prior Publication Data

US 2018/0089845 A1 Mar. 29, 2018

Related U.S. Application Data

(63) Continuation of application No. 14/897,428, filed as application No. PCT/KR2014/005038 on Jun. 9, 2014, now Pat. No. 9,818,194.

(30) Foreign Application Priority Data

Jun. 11, 2013 (KR) .................. 10-2013-0066825
Jun. 21, 2013 (KR) .................. 10-2013-0071956

(51) Int. Cl.
*G06T 7/33* (2017.01)
*G06T 3/00* (2006.01)
(Continued)

(52) U.S. Cl.
CPC ............... *G06T 7/337* (2017.01); *G06K 9/52* (2013.01); *G06K 9/6201* (2013.01);
(Continued)

(58) Field of Classification Search
USPC .................. 382/128, 131–132, 287, 294
See application file for complete search history.

(56) References Cited

U.S. PATENT DOCUMENTS 7,996,063 B2    8/2011  Vass et al.
8,226,560 B2    7/2012  Arai et al.
(Continued)

FOREIGN PATENT DOCUMENTS

KR    10-2010-0036000 A    4/2010
WO       2005109342 A1    11/2005

OTHER PUBLICATIONS

Communication dated Dec. 22, 2016, issued by the European Patent Office in counterpart European Application No. 14811493.7.
(Continued)

*Primary Examiner* — Ishrat I Sherali
(74) *Attorney, Agent, or Firm* — Sughrue Mion, PLLC

(57) ABSTRACT

An image registration method includes acquiring first image data for a target object that includes first coordinate information; acquiring second image data for the target object that includes second coordinate information, by using a probe; and registering the first image data with the second image data, using the first coordinate information and the second coordinate information. According to the image registration method, image registration between a plurality of pieces of volume data adjusted so that their coordinate axes correspond to each other is performed, whereby a high-quality registered image may be quickly and simply obtained.

16 Claims, 5 Drawing Sheets

(51) Int. Cl.
  *G06K 9/52* (2006.01)
  *G06K 9/62* (2006.01)
  *G06T 5/00* (2006.01)
  *G06T 7/00* (2017.01)
  *G06T 7/60* (2017.01)

(52) U.S. Cl.
  CPC ............ *G06T 3/0068* (2013.01); *G06T 5/006* (2013.01); *G06T 7/0016* (2013.01); *G06T 7/33* (2017.01); *G06T 7/60* (2013.01); *G06T 2207/10081* (2013.01); *G06T 2207/10088* (2013.01); *G06T 2207/10132* (2013.01)

(56) References Cited

U.S. PATENT DOCUMENTS

| | | | |
|---|---|---|---|
| 8,290,303 | B2 | 10/2012 | Washburn et al. |
| 9,818,194 | B2* | 11/2017 | Shin .................. G06K 9/52 |
| 2002/0167533 | A1 | 11/2002 | Tirumalai et al. |
| 2004/0054248 | A1* | 3/2004 | Kimchy ............. A61B 5/055 600/3 |
| 2006/0020195 | A1 | 1/2006 | Falco et al. |
| 2007/0043286 | A1 | 2/2007 | Lu et al. |
| 2007/0055150 | A1 | 3/2007 | Donaldson et al. |
| 2008/0013814 | A1 | 1/2008 | Carlsen |
| 2008/0118117 | A1 | 5/2008 | Gauldie |
| 2008/0230705 | A1* | 9/2008 | Rousso ............... A61B 5/415 250/363.04 |
| 2009/0124906 | A1 | 5/2009 | Caluser |
| 2010/0208963 | A1 | 8/2010 | Kruecker et al. |
| 2010/0239150 | A1* | 9/2010 | Ishikawa ........... A61B 5/0095 382/131 |
| 2010/0268073 | A1 | 10/2010 | Falco et al. |
| 2010/0286517 | A1 | 11/2010 | Kamen et al. |
| 2012/0035462 | A1* | 2/2012 | Maurer, Jr. ......... A61B 6/5247 600/411 |
| 2013/0259341 | A1* | 10/2013 | Mountney ........... A61B 5/0035 382/131 |
| 2015/0320400 | A1* | 11/2015 | Kim .................... G06T 7/337 600/407 |
| 2016/0063695 | A1 | 3/2016 | Lee |
| 2016/0093050 | A1* | 3/2016 | Kim .................... G06K 9/36 382/128 |
| 2018/0333112 | A1* | 11/2018 | Weber ................. A61B 6/12 |

OTHER PUBLICATIONS

Studholme C et al:"Automated 3-D registration of MR and CT images of the head", Medical Image Analysis, Oxforduniversity Press, Oxford, GB, vol. 1, No. 2, Apr. 1, 1996, pp. 163-175, XP002942556.

Wein et al., "Automatic CT-ultrasound registration for diagnostic imaging and image-guided intervention", Medical Image Analysis, vol. 12, Iss. 5, Jun. 19, 2008, pp. 577-585.

Lange et al., "3D ultrasound-CT registration of the liver using combined landmark-intensity information", International Journal of Computer Assisted Radiology and Surgery, Oct. 19, 2009, vol. 4, Iss. 1, pp. 79-88.

International Search Report (PCT/ISA/210) dated Sep. 17, 2014, issued in International Application No. PCT/KR2014/005038.

Communication dated Aug. 19, 2019, issued by the Korean Intellectual Property Office in counterpart Korean Application No. 10-2013-0071956.

* cited by examiner

[Fig. 1]
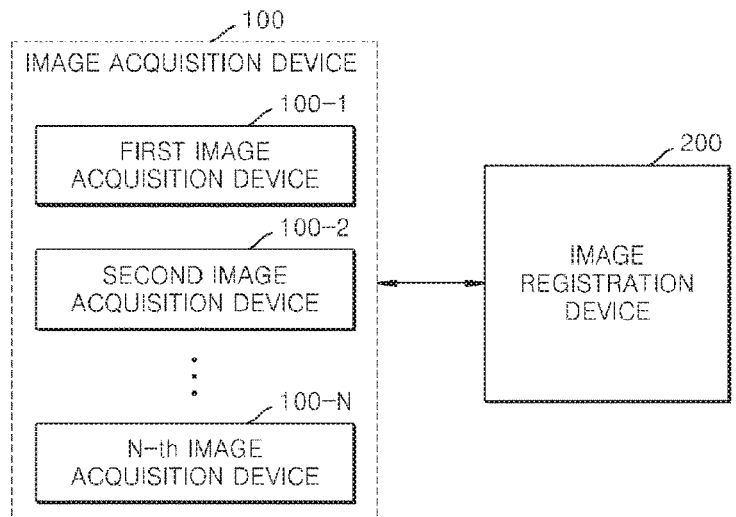
[Fig. 2]
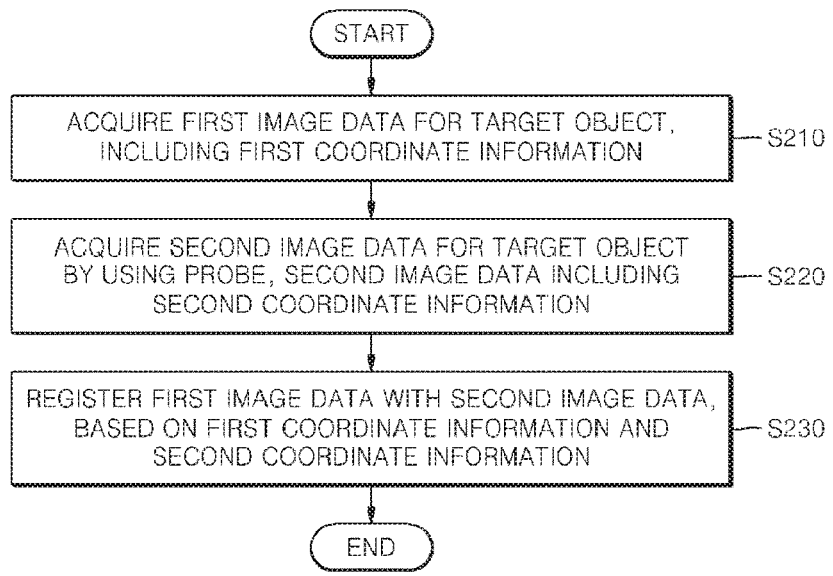
[Fig. 3a]
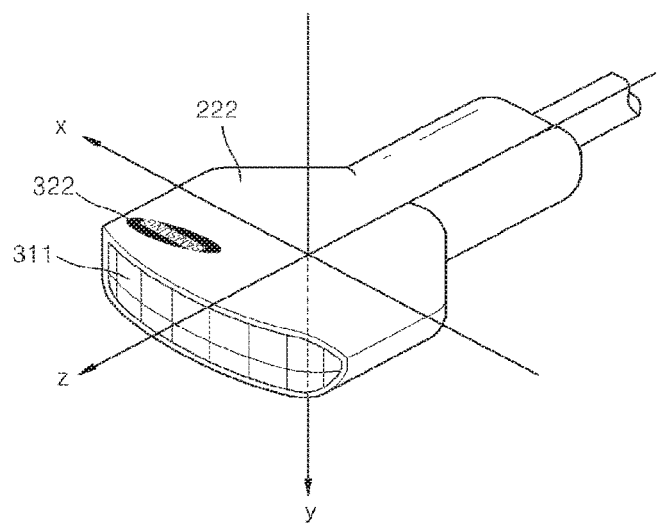

[Fig. 3b]
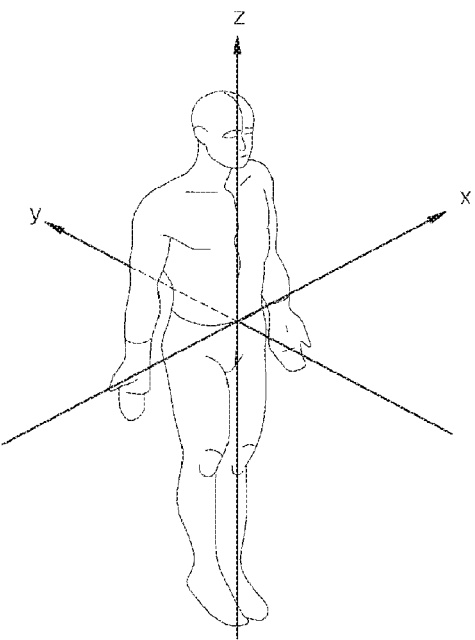
[Fig. 4a]
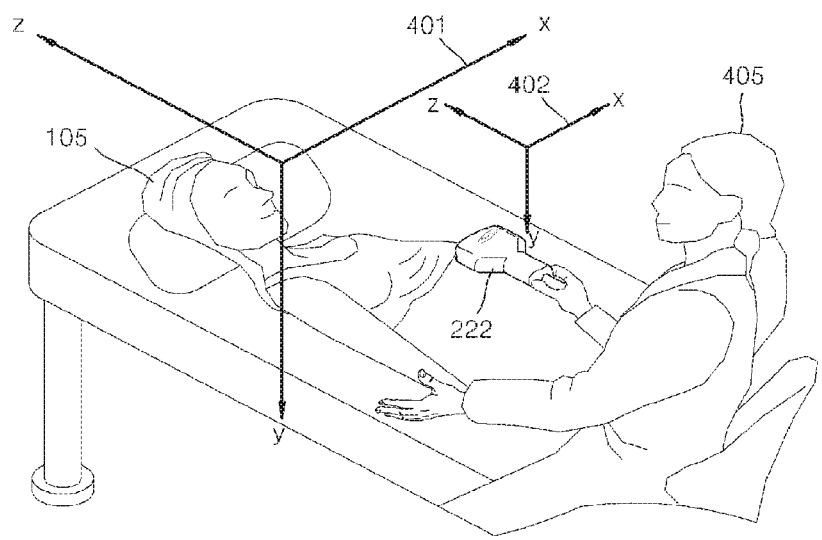

[FIG. 4b]
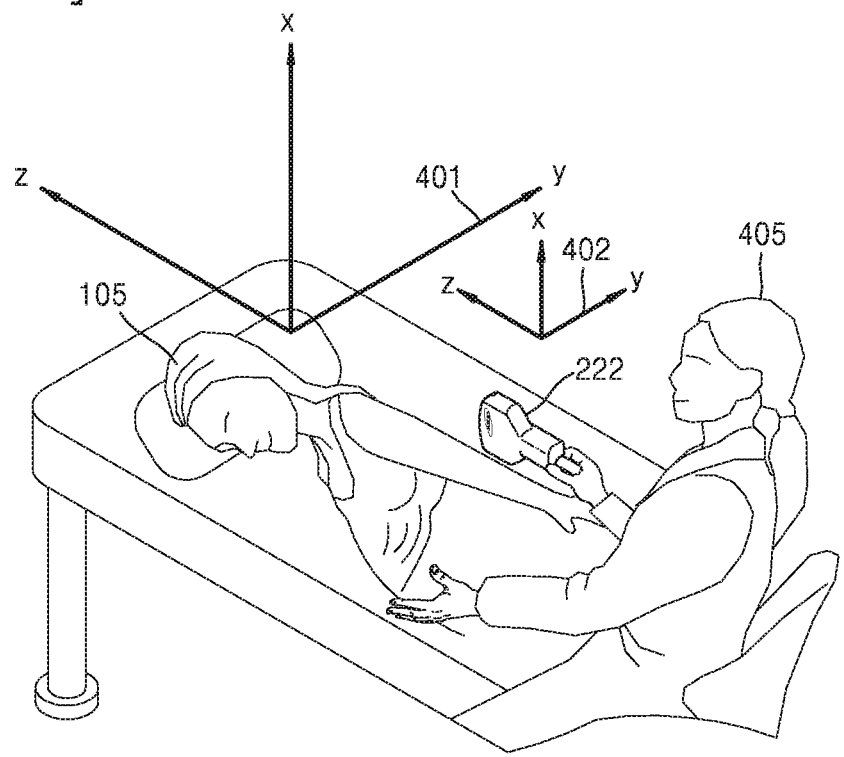
[FIG. 5a]
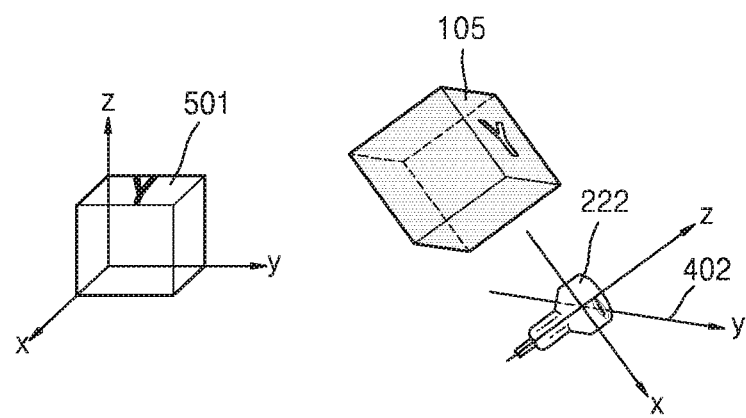
[FIG. 5b]
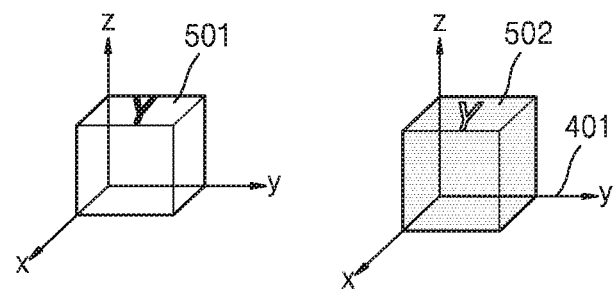

[Fig. 5c]
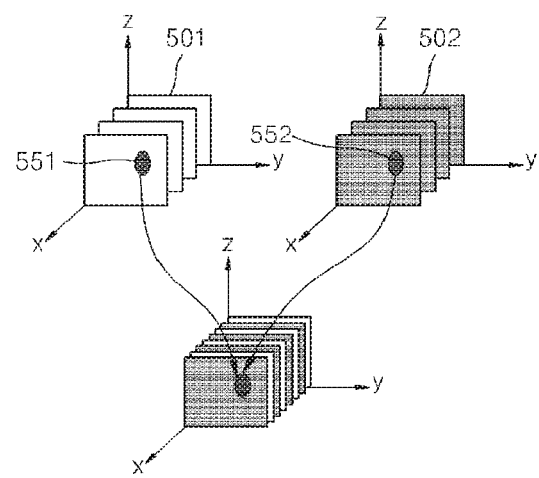
[Fig. 5d]
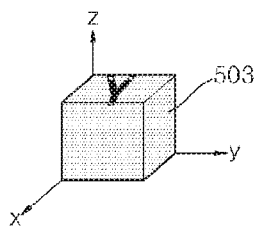
[Fig. 6a]
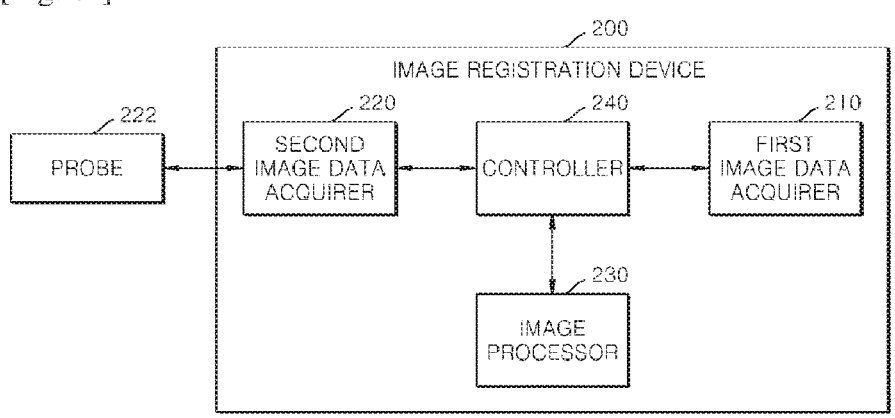

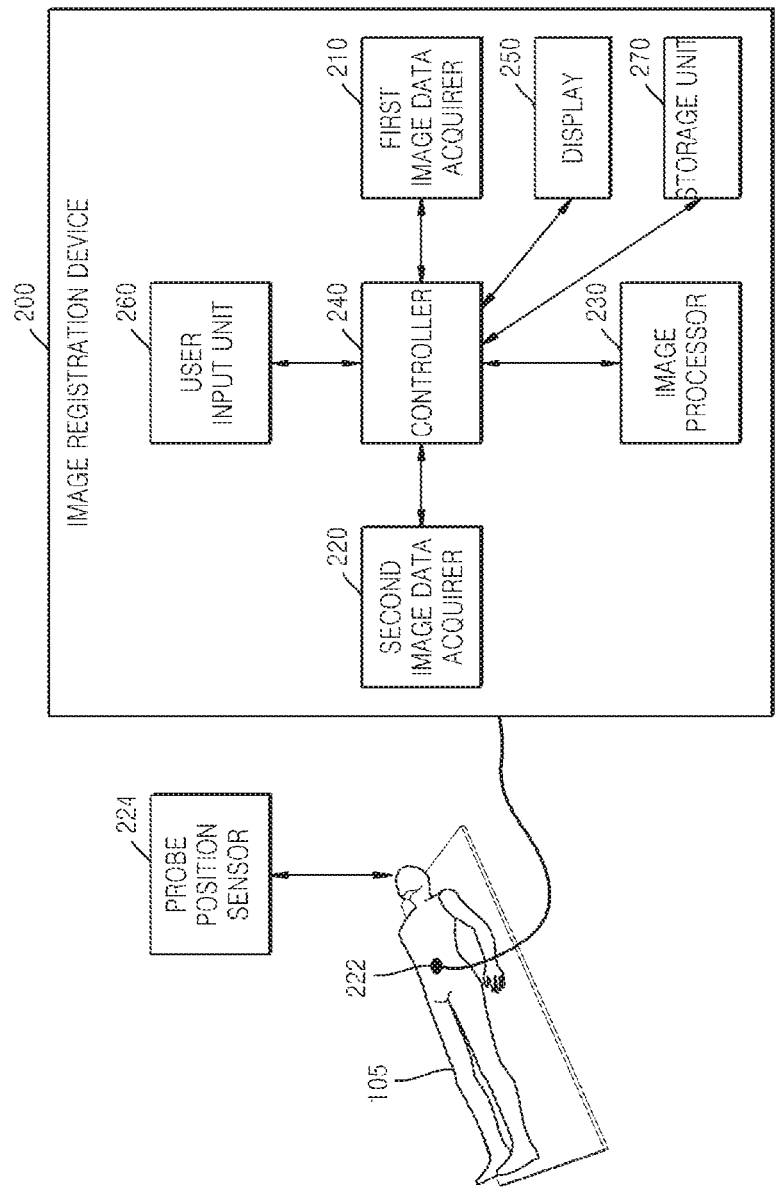

METHOD AND APPARATUS FOR IMAGE REGISTRATION

CROSS-REFERENCE TO RELATED APPLICATIONS

This application is a continuation of U.S. patent application Ser. No. 14/897,428 filed on Dec. 10, 2015 which is a National Stage of International Application PCT/KR2014/005038 filed on Jun. 9, 2014, which claims priority from the International Convention from Korean Application Nos. 10-2013-0066825 filed Jun. 11, 2013 and 10-2013-0071956 filed Jun. 21, 2013, the contents of which are incorporated herein by reference in their entities.

TECHNICAL FIELD

One or more embodiments of the present invention relate to a method and apparatus for image registration, and more particularly, to a user-friendly image registration method and apparatus that enable fast and accurate image registration.

BACKGROUND ART

Image registration is a process of transforming different images into a common coordinate space. Image registration may denote reconstruction of at least two images into a single synthesized image. A user may ascertain the correspondence between different images, according to image registration.

In the field of diagnosis based on medical images, image registration is widely used in order to compare images of a diseased body part with each other according to time, to compare images of a diseased body part with each other according to modalities of medical imaging and to compare an image of a diseased body part with an image of normal tissue. In In diagnosis, in order to use an image, which is obtained by increasing strengths of or remedying weaknesses of different image acquisition modalities, image registration is used in which acquired images are represented in a same space to facilitate comparison therebetween.

For example, when a lung or a stomach is filled with air, an ultrasonic diagnosis device, a computed tomography (CT) diagnosis device, and a magnetic resonance imaging (MRI) diagnosis device have difficulty in diagnosing a lesion when only medical images of the lung or stomach are viewed. There is therefore need for an image registration system capable of performing image registration between a medical image provided by a photographing device inserted into a region of interest of a target object and a medical image provided by an ultrasonic diagnosis device, a CT diagnosis device, or an MRI diagnosis device.

In addition, an ultrasound imaging system has noninvasive and nondestructive characteristics and is thus widely used in the medical field to obtain information about the inside of a target object. Since an ultrasound imaging system is capable of providing a high-resolution image of the inside of a target object to doctors in real time without having to perform a surgical operation of making an incision in the target object and observing it, the ultrasound imaging system is widely used in the medical field. However, since an ultrasonic image has a low signal-to-noise ratio, an image registration system for performing image registration between an image acquired using any of other medical image acquisition methods, such as a CT image, and an ultrasonic image is needed to address this problem.

An image registration method and apparatus capable of quickly providing an accurately registered image is needed by a user to accurately diagnose a disease by using a registered image.

DISCLOSURE

Technical Problem

In the conventional art, a method of registering different sets of image data by finding at least one of corresponding points, corresponding planes, and corresponding volumes between the different image data sets is used. Thus, according to such a conventional image registration method, a user should directly select at least one of a reference point, a reference plane, and a reference volume, in consideration of a direction of a target object. In addition, it takes a relatively long time for a user to directly search for and select at least one of a reference point, a reference plane, and a reference volume that is expected to be suitable for registration.

Technical Solution

To address these drawbacks of the conventional art, one or more embodiments of the present invention include a user-friendly image registration method and apparatus that enable fast and accurate image registration.

Additional aspects will be set forth in part in the description which follows and, in part, will be apparent from the description, or may be learned by practice of the presented embodiments.

According to one or more embodiments of the present invention, an image registration method includes acquiring first image data for a target object that includes first coordinate information; acquiring second image data for the target object that includes second coordinate information, by using a probe; and registering the first image data with the second image data, using the first coordinate information and the second coordinate information.

The acquiring of the second image data may include acquiring coordinate information of the probe that corresponds to a predetermined point of time.

The acquiring of the second image data may include predicting the second coordinate information for the second image data from coordinate information of the probe that corresponds to a predetermined point of time.

The second image data including the second coordinate information may be formed on an orthogonal coordinate system so that the value of an x axis increases in a direction from the left of the target object to the right thereof, that the value of a y axis increases in a direction from the anterior side of the target object to the posterior side thereof, and that the value of a z axis increases in a direction from the inferior side of the target object to the superior side thereof.

The coordinate information of the probe may include information about at least one of a direction, an inclination, and a rotation angle of the probe.

The registering of the first image data with the second image data may include comparing the first coordinate information with the second coordinate information; and transforming at least one of the first image data and the second image data, based on a result of the comparison.

The acquiring of the second image data may include displaying the second image data; and correcting at least one of yawing, pitching, and rolling of the second image data with respect to the second coordinate information, based on a user input associated with the displayed second image data.

The registering of the first image data with the second image data may include selecting a first reference point from at least one of the first image data and the second image data, based on a user input; selecting a second reference point corresponding to the first reference point from at least one of the first image data and the second image data; and registering the first image data with the second image data, based on the first reference point and the second reference point.

The image registration method may further include displaying at least one cross-section image extracted from third volume data, wherein the third volume data is produced by registering first volume data included in the first image data with second volume data included in the second image data.

The first image data may be acquired by a computerized tomography (CT) or magnetic resonance (MR) modality, and the second image data may be acquired by an ultrasonic modality.

According to one or more embodiments of the present invention, an image registration device includes a first image data acquirer which acquires first image data for a target object that includes first coordinate information; a second image data acquirer which acquires second image data for the target object that includes second coordinate information, by using a probe; and a controller which controls an image processor to register the first image data with the second image data, using the first coordinate information and the second coordinate information.

The image registration device may further include a probe position sensor which acquires coordinate information of the probe that corresponds to a predetermined point of time.

The image registration device may further include a probe position sensor which acquires coordinate information of the probe that corresponds to a predetermined point of time. The second image data acquirer may predict the second coordinate information for the second image data from the coordinate information of the probe.

The second image data including the second coordinate information may be formed on an orthogonal coordinate system so that the value of an x axis increases in a direction from the left of the target object to the right thereof, that the value of a y axis increases in a direction from the anterior side of the target object to the posterior side thereof, and that the value of a z axis increases in a direction from the inferior side of the target object to the superior side thereof.

The coordinate information of the probe may include information about at least one of a direction, an inclination, and a rotation angle of the probe.

The image processor may compare the first coordinate information with the second coordinate information and transform at least one of the first image data and the second image data based on a result of the comparison.

The image registration device may further include a display unit which displays the second image data. The second image data acquirer may correct at least one of yawing, pitching, and rolling of the second image data with respect to the second coordinate information, based on a user input associated with the displayed second image data.

The image processor may select a first feature point from at least one of the first image data and the second image data and a second feature point corresponding to the first feature point from at least one of the first image data and the second image data, based on a user input, and may register the first image data and the second image data based on the first reference point and the second reference point.

The image registration device may further include a display unit which displays at least one cross-section image extracted from third volume data. The third volume data may be produced by registering first volume data included in the first image data with second volume data included in the second image data.

The first image data may be acquired by a CT or MR modality, and the second image data may be acquired by an ultrasonic modality.

According to one or more embodiments of the present invention, a computer-readable recording medium has recorded thereon a program for executing the image registration method.

DESCRIPTION OF DRAWINGS

These and/or other aspects will become apparent and more readily appreciated from the following description of the embodiments, taken in conjunction with the accompanying drawings in which:

FIG. 1 is a block diagram of an image registration system including an image registration device according to an embodiment of the present invention;

FIG. 2 is a flowchart of an image registration method according to an embodiment of the present invention;

FIGS. 3A and 3B are views for describing coordinate information of a probe and coordinate information of a target object in the image registration method of FIG. 2;

FIGS. 4A and 4B are conceptual diagrams for describing the image registration method of FIG. 2;

FIGS. 5A through 5D are conceptual diagrams for describing the image registration method of FIG. 2; and FIGS. 6A and 6B are block diagrams of an image registration device according to embodiments of the present invention.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the the embodiments are merely described below, by referring to the figures, to explain aspects of the present description. Expressions such as "at least one of," when preceding a list of elements, modify the entire list of elements and do not modify the individual elements of the list.

In the drawings, parts irrelevant to the description are omitted for simplicity of explanation, and like numbers refer to like elements throughout.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements. Throughout the specification, a "target object" may denote a living thing or an inanimate object that an image is to represent. The target object may denote the entire or a part of a human body. For example, the target object may be an organ (for example, a liver, a heart, a womb, a brain, a breast, or an abdomen) or a fetus, or may be a cross-section of a human body.

Throughout the specification, a "user" may be a medical expert, such as a doctor, a nurse, a medical technologist, a sonographer, or a medical image expert, but the present invention is not limited thereto. Throughout the specification, an "image" may be an ultrasonic image, a magnetic resonance (MR) image, a computerized tomography (CT) image, a Positron Emission Tomography (PET) image, or the like, but the present invention is not limited thereto.

Throughout the specification, image data may denote a data set from which a medical image can be acquired and may be volume data or two-dimensional (2D) image data. Volume data may denote a data set of which a basic unit is a voxel and may also denote an image data set including space information together with an anatomical shape of a target object. A voxel denotes a basic unit that defines a three-dimensional (3D) space, together with a pixel serving as a basic unit that defines a point in a 2D cross-section. A voxel may include at least one of a coordinate value, a color value, and a density value.

The present invention will now be described more fully with reference to the accompanying drawings, in which exemplary embodiments of the invention are shown.

FIG. 1 is a block diagram of an image registration system including an image registration device 200 according to an embodiment of the present invention.

Referring to FIG. 1, the image registration system according to the present embodiment may include an image acquisition device 100 and the image registration device 200.

The image acquisition device 100 may be an apparatus that acquires a medical image of a target object. For example, the image acquisition device 100 may be a computed tomography (CT) device, a magnetic resonance imaging (MRI) device, an angiography device, an ultrasonic device, or the like, but the present invention is not limited thereto.

Since a CT device is capable of providing a cross-sectional image of a target object, the CT device may express an inner structure (e.g., an organ such as a kidney, a lung, etc.) of the object without an overlap therebetween, compared to a general X-ray capturing apparatus. The CT device may obtain a plurality of images with a thickness not more than 2 mm for several tens to several hundreds of times per second and then may process the plurality of images, thereby providing a relatively accurate cross-sectional image of the target object.

An MRI device is an apparatus for acquiring a sectional image of a part of a target object by expressing, in a contrast comparison, a strength of a MR signal with respect to a radio frequency (RF) signal generated in a magnetic field having a specific strength. For example, if an RF signal that only resonates a specific atomic nucleus (for example, a hydrogen atomic nucleus) is irradiated for an instant onto a target object that lies in a strong magnetic field and then such irradiation stops, an MR signal is emitted from the specific atomic nucleus, and thus the MRI device may receive the MR signal and acquire an MR image from the received MR signal. The MR signal denotes an RF signal emitted from the target object. An intensity of the MR signal may be determined according to a density of a predetermined atom (for example, hydrogen) of the target object, a relaxation time T1, a relaxation time T2, and a flow of blood or the like.

An ultrasonic device transmits an ultrasonic signal toward a certain inner part of a body by using a probe and obtains an image regarding a cross-section of soft tissue or an image regarding blood flow by using information about an ultrasonic signal reflected by the inner part of the body.

The image acquisition device 100 may include a plurality of image acquisition devices. For example, the image acquisition device 100 may include a first image acquisition device 100-1, a second image acquisition device 100-2, . . . , and an N-th image acquisition device 100-N.

The first image acquisition device 100-1 and the second image acquisition device 100-2 may be different types of image acquisition devices using different image acquisition modalities or the same kind of image acquisition devices using the same image acquisition modality. For convenience of explanation, it is hereinafter understood that the first image acquisition device 100-1 and the second image acquisition device 200-2 use different image acquisition modalities.

The image acquisition device 100 may acquire image data about a target object. For For example, the first image acquisition device 100-1 may acquire first image data according to a first image acquisition modality, and the second image acquisition device 100-2 may acquire second image data according to a second image acquisition modality. The first image image acquisition modality or the second image acquisition modality may be an ultrasonic image acquisition modality, an MR image acquisition modality, a CT image acquisition modality, a PET image acquisition modality, an X-ray image acquisition modality, an optical image acquisition modality, or a combination thereof.

The image registration device 200 may receive a plurality of pieces of image data from the image acquisition device 100 and register the received pieces of image data. The image registration device 200 may perform image registration in consideration of pieces of coordinate information of the plurality of pieces of image data. For example, the image registration device 200 may arrange the pieces of image data so that coordinate systems on which the pieces of image data are formed correspond to each other. This will be described in greater detail later with reference to FIG. 2.

The image registration device 200 may include at least one (for example, the second image acquisition device 100-2) of the first, second, through to N-th image acquisition devices 100-1, 100-2, through to 100-N. In this case, the image registration device 200 may directly acquire a medical image of the target object. For example, when the image registration device 200 includes an ultrasonic device, the image registration device 200 may directly acquire an ultrasound image of the target object. The image registration device 200 may perform registration between the directly acquired ultrasound image and an externally-received or pre-stored CT image.

A method in which the image registration device 200 performs registration between the pieces of image data by using the pieces of coordinate information will now be described with reference to FIG. 2.

FIG. 2 is a flowchart of an image registration method according to an embodiment of the present invention.

In operation S210, the image registration device 200 may acquire first image data for a target object, the first image data including first coordinate information.

The first image data may be acquired using a first image acquisition modality, for example, a CT or MR modality, but the present invention is not limited thereto. The first image data may include volume data.

The image registration device 200 may acquire the first image data from the first image acquisition device 100-1 included in the image registration device 200 or from the first image acquisition device 100-1 connected to the image registration device 200 by wire or wirelessly. Alternatively, the image registration device 200 may acquire first image data previously stored therein.

Coordinate information for image data may include information about a position of the image data on a coordinate system determined based on the target object.

For example, the coordinate information for the image data is explained based on a coordinate system used by the Digital Imaging and Communication in Medicine (DICOM) standard (hereinafter, referred to as a DICOM coordinate system).

Referring to FIG. 3B, the DICOM coordinate system may be configured with an x axis heading from the left of a body to the right thereof, a y axis heading from the anterior side of the body to the posterior side thereof, and a z axis heading from the inferior side of the body to the superior side thereof.

Thus, image data including coordinate information based on the DICOM coordinate system may be formed on an orthogonal coordinate system so that the value of the x axis increases in a direction from the left of the target object to the right thereof, that the value of the y axis increases in a direction from the anterior side of the target object to the posterior side thereof, and that the value of the z axis increases in a direction from the inferior side of the target object to the superior side thereof.

As another example, image data including coordinate information according to a coordinate system based on standard planes of a target object will now be described. The target object may include a coronal plane, a transverse plane, and a sagittal plane as the standard planes. The image data including the coordinate information according to the coordinate system based on the standard planes may be formed on an orthogonal coordinate system in which the coronal plane of the target object is an xy plane, the transverse plane thereof is an xz plane, and the sagittal plane thereof is an yz plane.

However, as to coordinate information according to embodiments of the present invention, a coordinate system determined based on a target object is not limited to the aforementioned example.

The image registration device 200 may acquire the first image data and correct at least one of yawing, pitching, and rolling of the first image data with respect to the first coordinate information. Due to errors or the like of the first image acquisition device 100-1 acquiring the first image data, a coordinate axis of the first image data is yawed, pitched, or rolled relative to a coordinate axis of the target object.

For example, as described above, first image data including first coordinate information based on the DICOM coordinate system needs to be formed so that the value of the x axis increases from the left of the target object to the right thereof.

However, as to actually-acquired first image data, mismatching between first coordinate information and the first image data, such as, increasing of the value of the x axis from the right of the target object to the left thereof or from the anterior side of the target object to the posterior side thereof, may occur.

Thus, when this mismatching occurs, the image registration device 200 may correct image data so that the first coordinate information and the first image data are accurately matched with each other, by correcting the yawing, pitching, and rolling of the first image data.

The image registration device 200 may display a predetermined image generated from the first image data and manually correct the first image data with respect to the first coordinate information based on a user input associated with the displayed image.

Alternatively, the image registration device 200 may automatically correct the first image data based on pre-stored anatomical information including coordinate information. The pre-stored anatomical information may include information about the positions of at least two structures matched with each other at a predetermined interval, in a predetermined shape, or at a predetermined angle on the coordinate system determined based on the target object. The term "structure" may be a cell, tissue, or an organ of a living body.

The image registration device 200 may determine the degrees of yawing, pitching, and rolling of the first image data with respect to the coordinate information included in the pre-stored anatomical information, and may correct the first image data according to the determined degrees.

For example, when the target object is a liver, an inferior vena cava (IVC) and a portal vein that cross at 90 degrees may be a basis for correcting the first image data for the liver with respect to the first coordinate information.

The image registration device 200 may store anatomical information that enables the IVC and the portal vein to be placed on the x axis and the y axis, respectively, on a coordinate system determined with respect to a liver. The image registration device 200 may search the first image data for the liver for voxels corresponding to the IVC and the portal vein. The image registration device 200 may correct the first image data so that the voxels corresponding to the IVC and the portal vein correspond to the x axis and the y axis, respectively, based on the pre-stored anatomical information.

The image registration method of FIG. 2 involves registering image data by using coordinate information. Thus, the accuracy of registration between pieces of image data depends on how accurately pieces of coordinate information of the pieces of image data represent the positions of regions corresponding to the pieces of image data within a target object.

Therefore, the image registration device 200 may increase the accuracy of image registration by correcting at least one of yawing, pitching, and rolling of the pieces of image data with respect to the pieces of coordinate information as described above.

In operation S220, the image registration device 200 may acquire second image data for the target object by using a probe. The second image data for the target object may include second coordinate information.

The second image data may be acquired using a second image acquisition modality, for example, an ultrasound modality, but the present invention is not limited thereto. The image registration device 200 may acquire the second image data from the second image acquisition device 100-2 included in the image registration device 200 or from the second image acquisition device 100-2 connected to the image registration device 200 by wire or wirelessly. Alternatively, the image registration device 200 may acquire second image data previously stored therein.

When including the second image acquisition device 100-2, the image registration device 200 may acquire second image data by using data obtained in real time via the probe. Alternatively, the image registration device 200 may acquire second image data by using data that has been obtained via the probe and previously stored therein.

The probe may be a 2D probe or a 3D probe.

For example, when a 2D probe is used, the image registration device 200 may acquire 2D image data for a cross-section of the target object, while changing the position of the 2D probe. The 2D image data acquired by the image registration device 200 may include include information about a position of the 2D probe when the 2D image data is acquired.

The image registration device 200 may acquire a plurality of pieces of image data for a plurality of cross-sections of the target object while changing the position of the 2D probe. In this case, the image registration device 200 may acquire volume data on a common space coordinate system from the plurality of pieces of image data for the plurality of cross-sections, based on the plurality of pieces of image data for the plurality of cross-sections and information about a plurality of positions of the probe.

For example, when a 3D probe is used, the image registration device 200 may acquire a plurality of pieces of image data for a plurality of cross-sections of the target object, by using the 3D probe at one time. In this case, the image registration device 200 may acquire volume data from the plurality of pieces of image data acquired via the 3D probe.

The image registration device 200 may acquire, as the second image data, 2D image data or volume data acquired via the probe.

The second image data acquired by the image registration device 200 may include second coordinate information.

The image registration device 200 may acquire coordinate information of the probe that corresponds to a predetermined point of time. The image registration device 200 may acquire second coordinate information from the coordinate information of the probe that corresponds to the predetermined point of time.

The coordinate information of the probe will be described below with reference to FIG. 3A.

A probe 222 included in the image registration device 200 may have a predetermined coordinate system.

For example, as illustrated in FIG. 3A, the image registration device 200 may previously set the direction from the inferior side of the probe 222 to the superior side thereof in a direction in which the value of the z axis increases, the direction from the anterior side of the probe 222 to the posterior side thereof in a direction in which the value of the y axis increases, and the direction from the left side of the probe 222 to the right side thereof in a direction in which the value of the x axis increases.

In the probe 222 of FIG. 3A, it is assumed that a surface 311 of the probe 222, on which a transducer is arranged, is the superior side of the probe 222. And it is assumed that a surface that is perpendicular to the surface 311 and on which an image 322 is displayed is the anterior surface of the probe 222.

However, the predetermined coordinate system for the probe 222 is not limited to the example of FIG. 3A, and may be changed according to a user input or setting of the probe 222.

The coordinate information of the probe 222 may include information about at least one of a direction, inclination, and rotation angle of the probe 222 within a space. The coordinate information of a probe may be obtained from a probe position sensor that is attached to the probe or provided in an outside space.

The direction of the probe 222 may denote at least one cardinal direction (namely, east, west, south, and north) indicated by at least one axis of the probe 222. The inclination of the probe 222 may denote an angle formed by at least one cardinal direction and at least one axis of the probe 222. That is, the inclination of the probe 222 may denote the inclination of an axis of the probe 222 with respect to the axis of the Earth. The rotation angle of the probe 222 may denote an angle formed by one axis of the probe 222 and a horizontal plane.

For example, the direction of the probe 222 of FIG. 3A may denote cardinal points (i.e., east, west, south, and north) of the z axis of the probe 222. The inclination of the probe 222 may denote an angle formed by an earth axis and the y axis of the probe 222. The rotation angle of the probe 222 may denote an angle formed by the x axis of the probe 222 and a horizontal plane.

The image registration device 200 may predict the second coordinate information of the second image data from the coordinate information of the probe 222 that corresponds to the predetermined point of time. In other words, the image registration device 200 may predict in which direction the second image data has been acquired from the target object, from the coordinate information of the probe 222 that corresponds to the predetermined point of time.

When the probe 222 is located at a position at the predetermined point of time, the image registration device 200 may assume that the probe 222 is located at a position where the coordinate system of the probe 222 corresponds to that of the target object.

For example, the position where the coordinate system of the probe 222 corresponds to that of the target object may be a position where the coordinate system of the probe 222 is parallel to that of the target object.

The coordinate system of the probe 222 being parallel to that of the target object may denote the x axis, the y axis, and the z axis of the coordinate system of the probe 222 being parallel to the x axis, the y axis, and the z axis of the coordinate system of the target object, respectively.

As another example, the position where the coordinate system of the probe 222 corresponds to that of the target object may be a position where the coordinate system of the probe 222 is perpendicular to that of the target object.

The coordinate system of the probe 222 being perpendicular to that of the target object may denote the x axis, the y axis, and the z axis of the coordinate system of the probe 222 being perpendicular to the z axis, the y axis, and the x axis of the coordinate system of the target object, respectively.

Based on this assumption, the image registration device 200 may predict the coordinate system of the target object from the coordinate information of the probe 222 that corresponds to the predetermined point of time. The image registration device 200 may predict in which direction the second image data has been acquired from the target object, based on the predicted coordinate system of the target object. In other words, the image registration device 200 may acquire the second image data including the second coordinate information from the predicted coordinate system of the target object.

A method of predicting the second coordinate information from the coordinate information of the probe 222 will be described later in more detail with reference to FIGS. 4A and 4B.

The image registration device 200 may provide a Graphical User Interface (GUI) so that a user determines a point of time when to input the coordinate information of the probe 222. At the determined point of time, the user may input the coordinate information of the probe 222, from which the second coordinate information is predicted, via the GUI provided by the image registration device 200.

For example, the user may locate the probe 222 so that the coordinate system of the probe 222 corresponds to that of the target object, at a predetermined point of time. The user may input the coordinate information of the probe 222 located at the predetermined point of time, to the image registration device 200 via the GUI provided by the image registration device 200.

The image registration device 200 may predict the coordinate system of the target object from the coordinate information of the probe 222 located at a position corresponding to the coordinate system of the target object by the user at the predetermined point of time. The image registration device 200 may acquire the second image data including the second coordinate information from the predicted coordinate system of the target object.

The image registration device 200 may acquire the second image data and correct at least one of yawing, pitching, and rolling of the second image data with respect to the second coordinate information. Since correction of image data has already been described above with reference to operation S210, a repeated description thereof will be omitted.

In operation S230, the image registration device 200 may register the first image data with the second image data, based on the first coordinate information and the second coordinate information.

When the first image data and the second image data are volume data, the image registration device 200 performs registration based on volume data.

When the first image data is volume data and the second image data is cross-section image data, the image registration device 200 may perform registration based on cross-section images by extracting a cross-section image corresponding to the second image data from the first image data and registering the extracted cross-section image with the second image data.

The image registration device 200 may compare the first coordinate information with the second coordinate information. The image registration device 200 may transform at least one of the first image data and the second image data, based on a result of the comparison between the first coordinate information and the second coordinate information.

For example, if the first coordinate information and the second coordinate information are pieces of information about the same coordinate system, the image registration device 200 does not need to perform an alignment process of making respective axes of pieces of image data identical to each other to register the pieces of image data. In other words, if the first image data and the second image data are pieces of image data formed on the same coordinate system, the axes of the first image data and the second image data coincide with each other. Accordingly, in this case, the image registration device 200 does not need to perform an alignment process of making the axes of pieces of image data identical with each other to register the pieces of image data.

However, if the first coordinate information and the second coordinate information are pieces of information about different coordinate systems, the image registration device 200 needs to perform an alignment process of making the axes of pieces of image data identical with each other to register the pieces of image data.

An alignment process of making the axes of pieces of image data be identical to each other will now be described by illustrating the case where the first image data is formed on a first coordinate system for the target object, the second image data is formed on a second coordinate system for the target object, and the first and second coordinate systems are different from each other.

In this case, the image registration device 200 may transform at least one of the first image data and the second image data so that the first image data corresponds to the second image data, by using the first coordinate information and the second coordinate information.

For example, the image registration device 200 may acquire a transform function between a first axis of the first coordinate system and a second axis of the second coordinate system, and transform at least one of the first image data and the second image data so that the first image data corresponds to the second image data, based on the acquired transform function.

Alternatively, the image registration device 200 may acquire a correlation between the first and second coordinate systems, based on the first coordinate information and the second coordinate information. The image registration device 200 may transform the coordinate of at least one of the first image data and the second image data, based on the acquired correlation. For example, the image registration device 200 may transform the second image data to data on the first coordinate system, based on the correlation between the first and second coordinate systems.

Accordingly, the image registration device 200 may simply and quickly acquire high-quality registered image data by registering the first image data and the second image data by using the first and second coordinate information.

The image registration device 200 may increase the accuracy of registration between the first image data and the second image data, via additional point registration based on a user input. To register the first image data and the second image data, the image registration device 200 may select a first reference point within at least one of the first image data and the second image data, based on a user input.

A reference point may be a certain point, line, region, or volume serving as a basis for distinguishing parts of a target object from each other. For example, the image registration device 200 may select, as a reference point, a region corresponding to an IVC and a portal vein within volume data for a liver.

The reference point may serve as a basis for registration between pieces of image data. For example, the reference point may be a region that can be an anatomical feature, or a region corresponding to a target tumor.

The image registration device 200 may select a second reference point corresponding to the first reference point, from at least one of the first image data and the second image data. For example, the image registration device 200 may search for a certain point corresponding to the first reference point from at least one of the first image data and the second image data, and automatically select the found point as the second reference point.

As another example, the image registration device 200 may manually select the second reference point corresponding to the first reference point, based on a user input. The image registration device 200 may register the first image data and the second image data based on the selected first and second reference points.

For example, the image registration device 200 may acquire a transform function between the selected first and second reference points and register the first image data and the second image data based on the acquired transform function.

The image registration device 200 may select a plurality of points, a plurality of lines, a plurality of regions, or a plurality of images corresponding to at least two structures disposed at a certain interval, in a certain shape, or at a certain angle, from each of the first and second image data, and may register the first image data and the second image data based on the selected points, lines, regions, or images.

Until an accurate registration result is obtained, the image registration device 200 may additionally and repeatedly perform point registration in which the first image data and the second image data are registered based on reference points selected by a user.

The image registration device 200 may provide a user with images extracted from pieces of image data automatically adjusted so that the coordinate axes of the pieces of image data correspond to each other. Therefore, according to an embodiment of the present invention, the user may accurately and quickly select at least one of a reference point, a reference plane, and a reference image serving as a basis for registration, from the images extracted from the pieces of image data automatically adjusted so that the coordinate axes of the pieces of image data correspond to each other.

The image registration device 200 may produce third image data by registering the first image data with the second image data. The image registration device 200 may display an image produced from the third image data.

The image registration device 200 may produce third volume data by registering first volume data included in the first image data with second volume data included in the second image data. The image registration device 200 may display at least one cross-section image extracted from the third volume data.

FIGS. 4A and 4B are conceptual diagrams for describing the image registration method of FIG. 2. Although the DICOM coordinate system is set as a coordinate system based on which image data is formed in FIGS. 4A and 4B, the present invention is not limited thereto.

For example, as illustrated in FIG. 4A, the probe 222 of the image registration device 200 may have a coordinate system 402 that is previously determined. A coordinate system 401 may be previously determined for a target object 105. For example, a coordinate system 401 predetermined for a target object 105 may be a DICOM coordinate system.

Prior to acquiring second image data for the target object 105, a user 405 may locate the probe 222 so that the coordinate system 401 of the target object 105 is parallel to the coordinate system 402 of the probe 222. The user 405 may input the coordinate information of the probe 222 corresponding to the predetermined point of time, that is, the coordinate information of the probe 222 that is located so that the coordinate system 401 for the target object 105 is parallel to the coordinate system 402 of the probe 222, to the image registration device 200.

For example, the user 405 may input a command to acquire the coordinate information of the probe 222 corresponding to the predetermined point of time to the image registration device 200, via the GUI provided by the image registration device 200. The image registration device 200 may acquire the coordinate information of the probe 222 corresponding to the predetermined point of time, by using a probe location sensor.

The image registration device 200 may predict the coordinate system of a target object from coordinate information of the probe 222 that corresponds to a predetermined point of time. According to the embodiment of FIG. 4A, the image registration device 200 may predict the coordinate system 401 of the target object 105 that is parallel to the coordinate system 402 of the probe 222, from the coordinate information of the probe 222 corresponding to the predetermined point of time.

The image registration device 200 may acquire the second image data via the probe 222, based on the predicted coordinate system 401 of the target object 105. The image registration device 200 may acquire, as the second coordinate information, information about the position of the second image data on the predicted coordinate system 401 of the target object 105.

Thus, the second image data acquired via the image registration method of FIG. 2 may include information representing at which point the second image data is located on the coordinate system of a target object and in which direction the second image data is acquired from the target object.

In the case of FIG. 4A, the image registration device 200 may acquire second image data formed on an orthogonal coordinate system so that the value of the x axis increases in a direction from the left of the target object 105 to the right thereof, that the value of the y axis increases in a direction from the anterior side of the target object 105 to the posterior side thereof, and that the value of the z axis increases in a direction from the inferior side of the target object 105 to the superior side thereof.

As illustrated in FIG. 4B, when the lying direction or angle of the target object 105 is changed from that of the target object 105 of FIG. 4A, an operation of predicting the coordinate system 401 of the target object 105 based on the second coordinate information of the probe 222 needs to be repeated in order to acquire second image data including the second coordinate information.

As illustrated in FIG. 4B, prior to acquiring the second image data of the target object 105, the user 405 may locate the probe 222 so that the coordinate system 401 of the target object 105 is parallel to the coordinate system 402 of the probe 222. The user 405 may may input the coordinate information of the probe 222 located so that the coordinate system 401 for the target object 105 is parallel to the coordinate system 402 of the probe 222, as the second coordinate information to the image registration device 200.

Accordingly, according to the image registration device 200, the second image data may include second coordinate information that is identical to the coordinate information included in the image data which has been acquired before the lying direction or angle of the target object 105 is changed. That is, according to the image registration device 200, image data may be formed on a uniform coordinate system regardless of the lying direction or angle of the target object 105.

In other words, in the example of FIGS. 4A and 4B, the image registration device 200 may acquire the second image data formed on the orthogonal coordinate system so that the value of the x axis increases in a direction from the left of the target object 105 to the right thereof, that the value of the y axis increases in a direction from the anterior side of the target object 105 to the posterior side thereof, and that the value of the z axis increases in a direction from the inferior side of the target object 105 to the superior side thereof, regardless of the lying direction or angle of the target object 105.

FIGS. 5A through 5D are conceptual diagrams for describing the image registration method of FIG. 2.

As illustrated in FIG. 5A, the image registration device 200 may acquire first volume data 501 for the target object 105, the first volume data 501 including the first coordinate information, as the first image data.

Thus, the image display apparatus 200 may acquire the coordinate information of the probe 222. The image registration device 200 may predict the coordinate system of the target target object 105 from the coordinate system 402 of the probe 222, based on the coordinate information of the probe 222. For example, the image registration device 200 may predict a coordinate system parallel to the coordinate system 402 of the probe 222, as the coordinate system of the target object 105.

As illustrated in FIG. 5B, the image registration device 200 may predict the coordinate system 401 of the target object 105 from the coordinate system 402 of the probe 222 corresponding to a predetermined point of time. The image registration device 200 may produce second volume data 502 formed on the predicted coordinate system 401, as the second image data.

As illustrated in FIG. 5B, when a first coordinate system on which the first volume data 501 is formed corresponds to a second coordinate system on which the second volume data 502 is formed, a separate operation of corresponding the axes of pieces of volume data to each other is not needed.

Accordingly, the image registration device 200 may still acquire the first volume data and the second volume data of which directions are aligned (i.e., the first volume data and the second volume data acquired from the target object in the same direction), without performing an alignment process of making the axes of pieces of volume data correspond to each other.

The image registration device 200 may increase the accuracy and speed of registration by registering the first volume data 501 and the second volume data 502 of which directions have been aligned.

As illustrated in FIG. 5C, the image registration device 200 may increase the accuracy of registration via additional point registration based on a user input.

The image registration device 200 may select a first reference point 551 and a second reference point 552 corresponding to each other from the first volume data 501 and the second volume data 502, respectively, based on a user input.

For example, as illustrated in FIG. 5C, the first reference point 551 and the second reference point 552 may be selected from one of a plurality of cross-section slices included in the first volume data 501 and the second volume data 502, respectively, but the present invention is not limited thereto. The first reference point 551 and the second reference point 552 may be directly selected from the first volume data 501 and the second volume data 502 without an operation of dividing each of the first volume data 501 and the second volume data 502 into a plurality of cross-section slices.

As illustrated in FIG. 5D, the image registration device 200 may produce third volume data 503 by registering the first volume data 501 and the second volume data 502 based on the first reference point 551 and the second reference point 552.

Although the first image data and the second image data are volume data in FIGS. 5A through 5D, the present invention is not limited thereto. The second image data acquired by the image registration method of FIG. 2 may include 2D image data including second coordinate information.

Even when the first image data is volume data and the second image data is 2D image data, the image registration device 200 performs the operations of FIGS. 5A and 5B. In other words, the image registration device 200 may predict the coordinate system of the target object 105 from the coordinate system 402 of the probe 222, and acquire second image data formed on the predicted coordinate system.

When the first image data is volume data and the second image data is 2D image data, a process in which the image registration device 200 registers the first and second image data is different from a process including the operations described with reference to FIGS. 5C and 5D.

When the second image data is 2D image data, the image registration device 200 may further perform an operation of extracting first 2D image data corresponding to the second image data from the first image data. The image registration device 200 may register register the first 2D image data with the second image data.

The image registration device 200 may increase the accuracy of registration via additional point registration based on a user input.

The image registration device 200 may select a first reference point from the second image data, based on a user input. The image registration device 200 may search the first image data for a second reference point corresponding to the first reference point.

The image registration device 200 may extract second 2D image data including the found second reference point from the first image data. The image registration device 200 may register the second 2D image data with the second image data.

The image registration device 200 may increase a search speed by using the first image data and the second image data having aligned directions, when searching for the first 2D image data or the second 2D image data corresponding to the second image data.

FIGS. 6A and 6B are block diagrams of the image registration device 200 according to embodiments of the present invention.

Each component of the image registration device 200 performs its corresponding operation of the image registration method of FIG. 2. Thus, although omitted, descriptions of the image registration method of FIG. 2 also apply to the image registration device 200 of FIGS. 6A and 6B.

Referring to FIG. 6A, the image registration device 200 may include a first image data acquirer 210, a second image data acquirer 220 including the probe 222, an image processor 230, and a controller 240.

The image registration device 200 may be realized in various forms. For example, the image registration device 200 may be implemented by using a fixed terminal or a movable terminal. Examples of the movable terminal may include a laptop computer, a personal digital assistant (PDA), and a tablet PC.

First, the first image data acquirer 210 may acquire the first image data of the target object 105 including the first coordinate information.

The first image data acquirer 210 may include the first image acquisition device 100-1 which directly acquires the first image data from the target object 105. Alternatively, the first image data acquirer 210 may receive first image data acquired by the first image acquisition device 100-1 that is separate from the image registration device 200, from the first image acquisition device 100-1. The first image data acquirer 210 may acquire first image data previously stored in the image registration device 200.

The second image data acquirer 220 may acquire the second image data for the target object 105 including the second coordinate information, by using the probe 222. The second image data acquirer 220 may include the second image acquisition device 100-2, which directly acquires the second image data from the target object 105.

The second image data acquirer 220 may acquire second image data including an ultrasound image acquired in real time by the probe 222. The second image data acquirer 220 may include a probe position sensor 224, which will be described later with reference to FIG. 6B.

The probe 222 may transmit a certain signal to the target object 105 and may receive an echo signal reflected by the target object 105. The image registration device 200 may acquire second image data by using a second image acquisition modality method using the probe 222. For example, the second image acquisition modality may be an ultrasound image acquisition modality. In this case, the probe 222 produces ultrasound image data by digitizing an echo signal, which is an ultrasound signal, received from the target object 105.

The probe 222 may include a 2D probe capable of acquiring cross-section image data of the target object 105, a 3D probe capable of acquiring image data, and a four-dimensional (4D) probe capable of acquiring both image data and time information.

The image processor 230 may register the first image data with the second image data, based on the first coordinate information and the second coordinate information. The image processor 230 may correct at least one of the first image data and the second image data based on the first coordinate information and the second coordinate information so that the axes of the first image data and the second image data are identical to each other.

The image processor 230 may register first image data and second image data resulting from the correction.

The controller 240 may control the image processor 230 to register the first image data and the second image data.

The controller 240 may control all of the operations of the image registration device 200 and may control the first and second image data acquirers 210 and 220 in order to perform image registration methods according to embodiments of the present invention.

Referring to FIG. 6B, the image registration device 200 may further include the probe position sensor 224, a display 250, a user input unit 220, and a storage unit 270. The probe position sensor 224 may detect position information of the probe 222. The position information of the probe 222 may include coordinate information of the probe 222 as well as a position of the probe 222 within a space.

The probe position sensor 224 may be a sensor included in the probe 222 or attached to the probe 222, for example, an inclination sensor.

Alternatively, the probe position sensor 224 may be located outside the probe 222. When the probe position sensor 224 is located outside the probe 222, it may be located within a shielded room in which image capturing is performed on the target object 105. A method in in which the probe position sensor 224 senses a position of the probe 222 is commonly known, and thus, a detailed description thereof will be omitted.

The display 250 may display the image data acquired by the first or second image data acquirer 210 or 220 or at least one cross-section image of the image data.

The display 250 may also display at least one cross-section image of third image data produced by the image processor 230.

The display 250 may also display information that is processed in the image registration device 200. For example, the display 250 may display status information necessary for acquiring and registering image data, a user interface (UI) or GUI associated with functions setting, and an image of the target object 105.

When a display panel of the display 250 forms a layer structure together with a touch pad, which is to be described later, to construct a touch screen, the display 250 may be used as an input device as well as an output device.

The display 250 may include at least one of a liquid crystal display (LCD), a thin film transistor-liquid crystal display (TFT-LCD), an organic light-emitting diode (OLED) display, a flexible display, a 3D display, and an electrophoretic display.

The user input unit 220 denotes a unit via which a user inputs information necessary for image registration.

Information for image registration may include, for example, a user input of additionally selecting at least one of a reference point, a reference plane, and a reference image serving as a basis for registration. The information for image registration may also include position information of a probe corresponding to a predetermined point of time and may include a user input of correcting at least one of yawing, pitching, and rolling of image data with respect to coordinate information.

The user input unit 260 may include, but is not limited to, a key pad, a dome switch, a touch pad (e.g., a capacitive overlay type, a resistive overlay type, an infrared beam type, an integral strain gauge type, a surface acoustic wave type, a piezoelectric type, or the like), a jog wheel, or a jog switch. In particular, as described above, when a touch pad forms a layer structure together with a display panel, the layer structure may be referred to as a touch screen.

The storage unit 270 stores a variety of information that the image registration device 200 needs to display information associated with image registration. The storage unit 270 may store, for example, but is not limited to, the first image, the second image data, and the like.

The storage unit 270 may include at least one type of storage medium selected from among a flash memory type, a hard disk type, a multimedia card micro type, a card type memory (for example, a secure digital (SD) or extreme digital (XD) memory), random access memory (RAM), static random access memory (SRAM), read-only memory (ROM), electrically erasable programmable ROM (EE-PROM), programmable ROM (PROM), magnetic memory, a magnetic disk, and an optical disk. The image registration device 200 may operate a web storage or a cloud server on the Internet which performs a storage function of the storage unit 270.

According to the image registration device and method according to the aforementioned embodiments of the present invention, image registration between a plurality of pieces of volume data adjusted so that their coordinate axes correspond to each other is performed without a user's operation of selecting a certain plane as a basis for registration, whereby a high-quality registered image may be quickly and simply obtained.

Moreover, even when a user performs additional registration by selecting at least one of a reference point, a reference plane, and a reference volume serving as a basis for registration, images extracted from pieces of volume data adjusted so that the coordinate axes of the pieces of volume data correspond to each other are displayed, whereby the user may accurately and quickly select at least one of a reference point, a reference plane, and a reference image serving as a basis for registration.

The embodiment of the present invention can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage and communication media. The computer-readable storage medium includes all volatile/non-volatile and removable/non-removable media embodied by a certain method or technology for storing information such as computer-readable instruction code, a data structure, a program module, or other data. The communication medium typically includes the computer-readable instruction code, the data structure, the program module, or other data of a modulated data signal, or other transmission mechanism, and includes any information transmission medium.

The exemplary embodiments should be considered in descriptive sense only and not for purposes of limitation. Descriptions of features or aspects within each embodiment should typically be considered as available for other similar features or aspects in other embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An image registration method comprising:
   acquiring first image data for a target object including coordinate information of the first image data;
   acquiring location information of a probe corresponding to a point of time which is determined based on a user input;
   acquiring second image data for the target object, by using the probe;
   converting the second image data based on the location information of the probe, and
   registering the first image data with the converted second image data, based on the coordinate information of the first image data,
   wherein the coordinate information of the first image data comprises information about a position of the first image data on a coordinate system of the target object.

2. The image registration method of claim 1, wherein the converting of the second image data comprises converting coordinate information of the second image data based on the location information of the probe that corresponds to the point of time, and
   wherein the registering of the first image data with the converted second image data comprises registering the first image data with the converted second image data, using the coordinate information of the first image data and the converted coordinate information of the second image data.

3. The image registration method of claim 2, wherein the converting of the coordinate information of the second image data comprises:
   predicting the coordinate system of the target object based on the location information of the probe located at the position corresponding to the coordinate system of the target object; and
   converting the coordinate information of the second image data based on the predicted coordinate system of the target object.

4. The image registration method of claim 2, wherein the registering of the first image data with the converted second image data comprises:
   comparing the coordinate information of the first image data with the converted coordinate information of the second image data; and
   transforming at least one of the first image data and the second image data, based on a result of the comparison.

5. The image registration method of claim 1, wherein the registering of the first image data with the converted second image data comprises:
   selecting a first reference point from at least one of the first image data and the converted second image data, based on a user input;
   selecting a second reference point corresponding to the first reference point from at least one of the first image data and the converted second image data; and
   registering the first image data with the converted second image data, based on the first reference point and the second reference point.

6. The image registration method of claim 5,
   wherein the first reference point and the second reference point comprises a region that can be an anatomical feature, or a region corresponding to a target tumor.

7. The image registration method of claim 1, wherein the acquiring of the first image data comprises correcting at least one of yawing, pitching, and rolling of the first image data based on the coordinate information of the first image.

8. The image registration method of claim 1, wherein the acquiring of the first image data comprises correcting automatically the first image data based on pre-stored anatomical information including second coordinate information.

9. An image registration device comprising:
   a first image data acquirer configured to acquire first image data for a target object including coordinate information of the first image data;
   a probe position sensor configured to acquire location information of a probe corresponding to a point of time which is determined based on a user input;
   a second image data acquirer configured to acquire second image data for the target object, by using the probe; and
   a controller configured to convert the second image data based on the location information of the probe, and to register the first image data with the converted second image data, based on the coordinate information of the first image data,
   wherein the coordinate information of the first image data comprises information about a position of the first image data on a coordinate system of the target object.

10. The image registration device of claim 9,
    wherein the controller further configured to: convert the second image data by converting coordinate information of the second image data based on the location information of the probe that corresponds to the point of time; and
    register the first image data with the converted second image data, using the coordinate information of the first image data and the coordinate information of the second image data.

11. The image registration device of claim 10,
    wherein the controller further configured to:
    predict the coordinate system of the target object based on the location information of the probe located at the position corresponding to the coordinate system of the target object; and
    convert the second image data by converting the coordinate information of the second image data based on the predicted coordinate system of the target object.

12. The image registration device of claim 10, wherein the controller further configured to:
    compare the coordinate information of the first image data with the converted coordinate information of the second image data; and transform at least one of the first image data and the converted second image data, based on a result of the comparison.

13. The image registration device of claim 9, wherein the controller further configured to:
select a first reference point from at least one of the first image data and the converted second image data, based on a user input;
selecting a second reference point corresponding to the first reference point from at least one of the first image data and the converted second image data; and
register the first image data with the converted second image data, based on the first reference point and the second reference point.

14. The image registration device of claim 13, wherein the first reference point and the second reference point comprises a region that can be an anatomical feature, or a region corresponding to a target tumor.

15. The image registration device of claim 9, wherein the controller further configured to correct at least one of yawing, pitching, and rolling of the first image data based on the coordinate information of the first image.

16. The image registration device of claim 9, wherein the controller further configured to correct automatically the first image data based on pre-stored anatomical information including second coordinate information.

* * * * *